Figure 1:
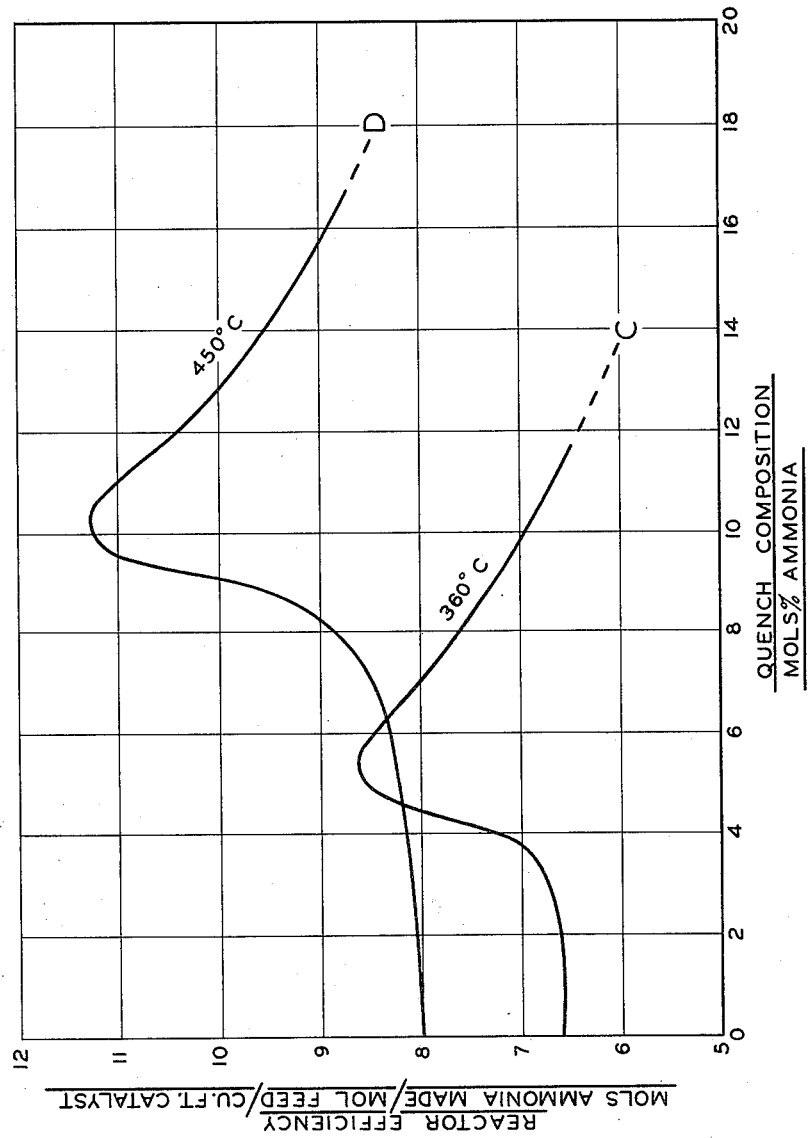

3,002,816
METHOD OF EFFECTING EXOTHERMIC CATALYTIC REACTIONS
Leo Friend, New Rochelle, N.Y., and Manfred von Stein, East Orange, N.J., assignors to The M. W. Kellogg Company, Jersey City, N.J., a corporation of Delaware
Filed July 23, 1958, Ser. No. 750,402
21 Claims. (Cl. 23—199)

This invention relates to the treatment of synthesis gas in a reactor and more particularly, it concerns the cooling of synthesis gas in a reactor. In one aspect, the invention relates to the treatment of ammonia synthesis gas in a reactor and more particularly, to an improved method of cooling ammonia synthesis gas in a reactor containing catalyst.

The interaction of hydrogen and nitrogen in the presence of a catalyst to form ammonia is a strongly exothermic reaction wherein more than 1,000 B.t.u.'s per pound of ammonia product are generated. In order to maintain an optimum temperature distribution in the reaction zone, it is necessary to provide a means of dissipating the excess heat generated in the system. When such means are not provided, the prohibitively high temperatures reached in the reaction zone cause the burning and inactivation of the catalyst. This problem is of great commercial importance; consequently, several methods of cooling the reactant gases have been devised.

According to one method in the art, the heat produced in a synthesis reaction is removed by indirect heat exchange with a cooling fluid. Conventionally, this heat exchange is provided by passing a fluid through tubes disposed within a catalyst bed of the reaction zone. Processes providing a plurality of catalyst beds have been cooled by this process. In another method, the catalyst is arranged in a series of beds with heat removal being effected by circulating a liquid through connecting chambers adjacent to the individual catalyst beds. The latter method provides better temperature control and is much more effective in preventing localized overheating than a cooling system which makes use of indirect heat exchange. However, while these methods accomplish a cooling effect, they are not beneficial in the production of higher yields of ammonia and are not efficient in the overall conversion process.

It is an object of this invention to provide an improved process for the treatment of synthesis gas within a reactor.

It is another object of this invention to provide an improved method for quenching the reactant gases in the synthesis of ammonia from nitrogen and hydrogen.

It is still another object of this invention to provide an improved method for carrying out the synthesis of ammonia from nitrogen and hydrogen which results in an increased yield of ammonia per pound of catalyst.

Still another object of this invention is to provide an ammonia synthesis process wherein the synthesis is carried out at ambient temperature within the reaction zone.

These and other objects of the invention will become apparent to those skilled in the art from the following description and disclosure.

The present invention relates particularly to a catalytic, exothermic type reaction and to the cooling of gaseous reactants within a reactor or converter containing a plurality of catalyst beds before the heat of reaction reaches the temperature at which the catalyst is decomposed or the equilibrium temperature of the reaction. For the purposes of the present invention, the equilibrium temperature of the reaction, referred to herein, is the isothermic equilibrium which would be attained in an infinite bed under adiabatic conditions. The cooling is effected by means of a quench material containing between 3.5 volume percent of the product of the synthesis reaction and an amount of product not above the concentration of the product formed in the gases to be quenched. The remaining composition of the quench material comprises a mixture containing components of the reaction and inert materials, for example, argon, nitrogen, etc. The effluent gas leaving the first catalyst bed at a temperature below the decomposition temperature of the catalyst and below the equilibrium temperature of the reaction is cooled before entering the next bed to a temperature substantially below the exit temperature of the preceding catalyst bed to permit further reaction of the synthesis gases and to control the temperature within the above limit, namely, the temperature at which the catalyst is deactivated and the equilibrium temperature of the reaction. This method of cooling between beds is repeated as often as is necessary to prevent the temperature in the converter from reaching the temperature limit of the reaction.

The present invention is applicable to all processes wherein a synthesis gas, which is caused to react in the presence of a catalyst under adiabatic conditions, generates such quantities of heat that the catalyst is damaged or that other temperature limitations of the reaction are exceeded. Specific processes wherein this invention may be beneficially applied are, for example, in the synthesis of ammonia from its elements and the synthesis of methanol from an oxide of carbon and hydrogen. For the sake of simplicity, and by way of illustration, the following description will be confined to the synthesis of ammonia. However, it is to be understood that other catalytic exothermic processes having cooling problems within a reaction zone such as in methanol synthesis, are also applicable to the process herein proposed.

Among the catalysts which are most useful in the synthesis of ammonia are osmium, metallic uranium, molybdenum, tungsten, pumice covered with metallic sodium, fused or sintered metallic iron, iron oxide, and carbides and nitrides of uranium, molybdenum, tungsten, or iron. One of these materials or any combination thereof may be used unsupported or may be supported on a carrier such as, for example pumice, alumina, silica, activated carbon, etc. A number of these carriers serve a dual purpose and act as activators as well as supports for the catalyst. Some additional activators which also may be used singly or in combination are the metal oxides, such as magnesium oxide, potassium oxide, sodium oxide, chromium oxide, barium oxide, etc. The preferred catalyst of the present invention is ferric oxide.

As the temperature of the present process should not be allowed to reach the temperature at which the catalyst is decomposed, and since many of the catalysts generally employed in ammonia synthesis decompose at between about 500° C. and about 530° C. (as reported in The Handbook of Catalysis by G. M. Schwab), the process of the present invention is preferably operated at a temperature from 300° C. to 530° C. and most preferably from 330° C. to 500° C. For example, ferric oxide manufactured from Swedish magnetite decomposes at about 530° C. The upper temperature limit of 530° C. has been set partly for the economy of operation of the present process with a particular catalyst. At higher temperatures, the rate of ammonia formation is considerably decreased and large amounts of unreacted gases are removed in the product effluent from the converter. These unreacted gases are compressed and recycled to the converter. However, present day methods of compressing large quantities of gas, and the size of the compressors employed render operation at higher temperatures economically prohibitive and, therefore, not commercially feasible. Should some future development make this operation more economical or a catalyst be developed that has higher activity, the temperature to which the present process is limited, could be expanded provided that the temperature did not exceed or reach the decomposition temperature of the catalyst employed in the reaction or approach the equilibrium temperature so closely that operation would not be economical.

Since the formation of ammonia is accompanied by volume contraction, the ammonia synthesis is favored by the use of elevated pressure. Therefore, the reaction is generally carried out at a pressure ranging from about 100 atmospheres to about 1,000 atmospheres, preferably from about 200 to about 500 atmospheres.

In a typical ammonia synthesis process, the feed gases are pretreated before entering the reaction zone. That is, the hydrogen and nitrogen gases are prepared by a series of steps which include the reforming of light hydrocarbons with steam and air followed by a water-gas shift step and purification to remove undesirable materials. The purified gases are then fed into a reactor where they are contacted with a catalyst at an elevated temperature and pressure.

The catalyst form employed may vary depending on the type of catalyst and its arrangement in the reactor. Usually the catalyst is in the form of lumps, granules, or particles of such a size and shape to allow passage of large quantities of gas therethrough without excessive pressure drop. The catalytic material is usually arranged in a vertically elongated catalyst chamber. However, catalyst chambers of other shapes are also included within the scope of this invention for sequential flow of gases therethrough.

In the present invention, it is necessary to cool the gaseous reactants after leaving the catalyst bed in order to maintain a suitable temperature for the optimum production of ammonia. The cooling process is facilitated by arranging the catalyst in a plurality of beds in series. In the process of this invention, the catalyst is, therefore, disposed in a reaction chamber in a series of separate beds. When carrying out ammonia synthesis over a plurality of catalyst beds, it is preferred to operate in such a manner that a similar temperature distribution or gradient, for example, between about 330° C. and about 500° C., is provided in each catalyst bed and it is most desirable to operate with substantially the same quantity of quench material to each of the beds. Generally, the amount of quench material added between two catalyst beds varies between about 0.2 and about 12.5 volumes per volume of synthesis feed gas, preferably about 5.5 or 6.5 volumes of quench per volume of synthesis gas. Both of these conditions can be met by varying the size of the successive catalyst beds. In a preferred embodiment, the sizes of the beds are increased progressively in the direction of reactant flow to provide a uniform rate of reaction and to provide uniform catalyst bed inlet and outlet temperature; however, this arrangement is not essential for the success of this reaction and other arrangements and modifications may also be employed. For example, the process may be carried out in beds of equal size and, by increasing the volume of quench, either the catalyst bed inlet or the catalyst bed outlet temperature can be controlled to provide uniform bed inlet or outlet temperatures.

The optimum size of the catalyst bed at a given temperature and pressure can be determined by adapting the Temkin-Pyzhev equation [1] to adiabatic conditions.

[1] Temkin and Pyzhev, Journal of Physical Chemistry (U.S.S.R.), 1946, volume 20, page 151.

In a particular and preferred embodiment of ammonia synthesis, the synthesis gas feed comprising hydrogen and nitrogen in a volumetric ratio of about 3:1, based on pure nitrogen and hydrogen is compressed, preheated and introduced into a reactor or conversion chamber containing several beds of a suitable catalyst as previously described, preferably ferric oxide. As the reaction is exothermic, the reactants are preferably introduced into the first catalyst bed of the converter at a temperature between about 340° C. and about 485° C. As the reactants pass through the first bed, a partial conversion to ammonia takes place accompanied by the evolution of substantial quantities of heat thus increasing the temperature of the reaction mixture. The hot gases leaving each of the plurality of beds are cooled by the introduction of a quench material. The temperature and quantity of the quench introduced is sufficient to cool and maintain the total gas in the catalyst bed at a temperature which does not exceed 530° C., preferably which does not exceed 500° C., when iron oxide is employed as the catalyst. Generally, the factors which determine temperature at which gases should be quenched are the decomposition temperature of the catalyst and the rate at which the reaction is approaching a state of equilibrium. Preferably, the gases are quenched before the decomposition temperature of the catalyst is reached and before the rate of reaction falls below 5 percent conversion to the ammonia product. Although the quench is introduced at any temperature below the temperature at which the catalyst is burned and the equilibrium temperature of the reaction, the temperature of the quench material is preferably at least 50° C. below the temperature of the reactants in the catalyst zone, and preferably not more than 100° C. below the temperature of the reactants in the catalyst zone. Most preferably, the effluent gases from the catalyst bed are quenched to a temperature of between about 420° C. and about 480° C. The passage of unreacted gases and ammonia product through the succeeding beds in the series is followed by similar cooling steps, if required, to provide a similar temperature pattern in each catalyst bed. The product gas from the final catalyst bed is removed from the reactor, cooled and passed to a separation zone to recover an improved yield of ammonia. Separation may be effected by a flash drum, fractional distillation, condensation or by any other convenient means. For example, several separation steps including flashing and condensing can be employed and the unconverted hydrogen and nitrogen recovered from the reaction product can be recycled to the reactor as part of the feed thereto.

In previous methods of carrying out ammonia synthesis, with the introduction of quench material for the purpose of controlling the reaction temperature, it has been found convenient to employ hydrogen and nitrogen gases separated from the ammonia reaction product as the quench material. Insmuch as the reaction product contains substantial amounts of ammonia, it has been considered necessary to separate this material from the unconverted reactants in order to provide the required quench substantially free of ammonia. In commercial operations employed in the past, the quantity of ammonia in the quench stream has been reduced to less than 2.5 percent and preferably less than 2 percent by volume of the quench material. Since it was believed that ammonia in the quench material would shift the equilibrium of the reaction to the left resulting in the formation of more nitrogen and hydrogen, and thus defeat the purpose of the reaction to form ammonia. This product has always been reduced to the barest minimum (optimum no more than 0.5 percent in the quench gases).

Contrary to the teaching in the art, it has been found that operating in the conventional manner in which ammonia in the quench gas is reduced to trace amounts, does not provide the highest overall yield of ammonia per pound of catalyst. It has been unexpectedly determined that the use of quench material containing substantial amounts of ammonia provides a process which significantly increases the overall amount of ammonia produced per pound of catalyst per mol of feed while at the same time, provides an economically feasible and efficient method of operation. This finding is surprising in that it is contrary to the teaching of other investigators.

In accordance with this invention, the effluent gas separated from each catalyst bed is cooled with a quench material containing relatively large amounts of ammonia as described above. To achieve the proper concentration of ammonia in the quench stream, ammonia may be purposely added to, or may be already present in the quench material. It is also within the scope of this invention to prepare quench by independently mixing ammonia, nitrogen and hydrogen in the proper proportions and storing this quench material until needed in a separate storage unit. The amount of ammonia present in the quench is critical in obtaining the improved yields of ammonia and is at least 3.5 percent by volume. At 3 percent by volume of ammonia in the quench, some improvement in the ammonia product yield is noticeable but it is relatively slight compared to the 20 or 30 percent increase obtained with a higher concentration of ammonia in the quench gas. The critical limits, therefore, lie between about 3.5 volume percent of ammonia and about a volume percent of ammonia equal to that in the material to be quenched based on a mol of the gaseous feed. Above this amount the advantage is lost as the higher concentration of ammonia aids in establishing equilibrium conditions.

To a certain extent the effectiveness of the ammonia-enriched quench in increasing the ammonia yield per pound of catalyst per mol of feed depends on the temperature and pressure at which the synthesis reaction is carried out. More particularly, the temperature varies inversely with the pressure and, as the temperatue is raised, the amount of ammonia in the quench gas is increased.

By way of example, reference is now had to FIGURE 1 of the drawings wherein it is shown that under 285 atmospheres pressure and about 360° C. ferric oxide catalyst bed temperature, the optimum amount of ammonia in the quench gas is between about 3.75 and about 9.5, preferably between 4.5 and about 7 mol percent ammonia per mol of feed; whereas at 450° C. ferric oxide catalyst bed temperature and the same pressure, the optimum amount of ammonia in the quench gas is between about 7 and about 17, preferably between about 9 and about 13 mol percent of ammonia per mol of feed. Thus, FIGURE 1 illustrates the relationship between the temperature and the amount of ammonia used in the quench gas. Although the lowering of the reaction temperature lowers the requirement of ammonia employed in the quench, it is noted that the yield of ammonia per pound of catalyst is also lowered.

Figure 2:
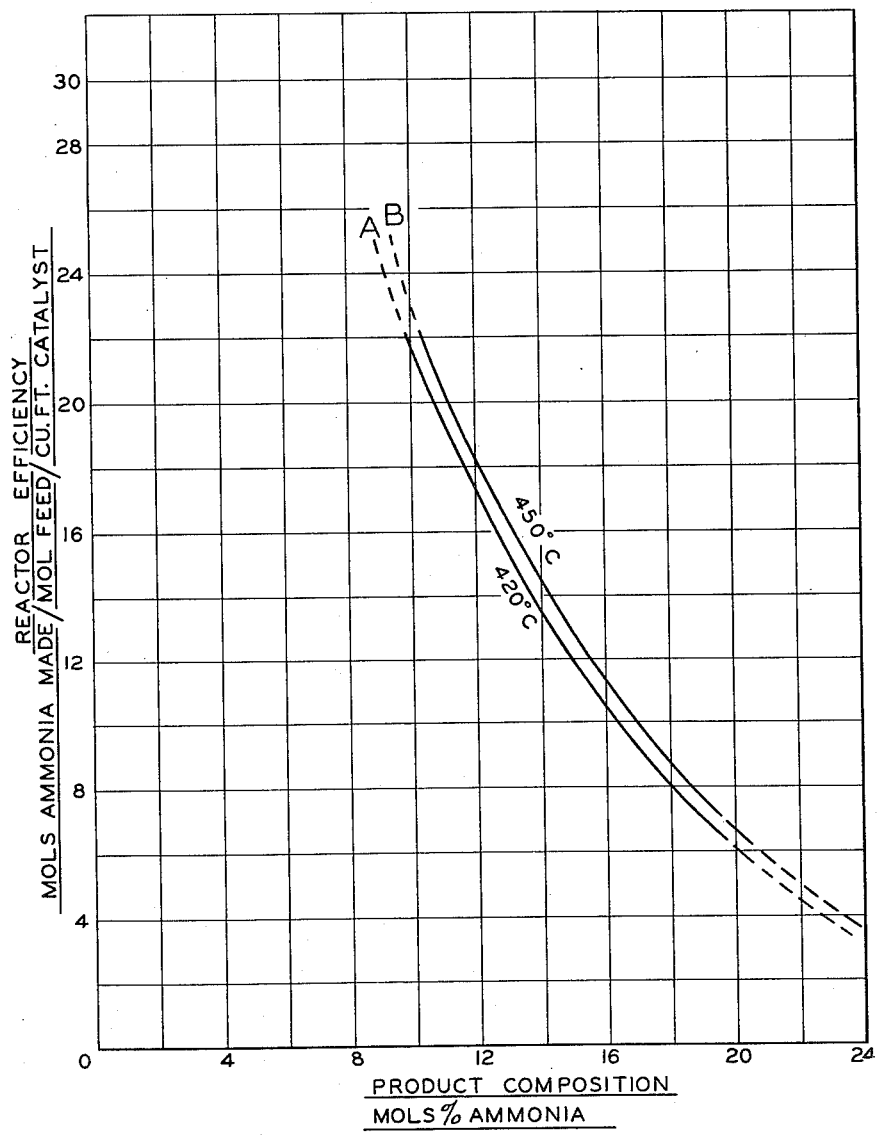

When operating with an average catalyst bed temperature of about 475° C. and 285 atmospheres pressure, the desirable ammonia concentration of the quench varies between about 7.5 and about 18 percent by volume or more preferably between about 9.5 and about 15 percent. The efficiency of this operation is such that between about 9 and about 11 mols per hour of ammonia product are made per cubic foot of catalyst. When the average reaction temperature in the catalyst bed is decreased to about 425° C. and the same pressure, the ammonia concentration in the quench is reduced to between 4 and about 10 percent by volume, with a preferred concentration of between about 5 and about 8 percent. However, at the same time, the efficiency of the reactor is decreased and the amount of ammonia produced is reduced to between about 7 and about 8.5 mols per hour per cubic foot of catalyst. This represents a drop in yield of about 25 percent. The reactor efficiency is illustrated by FIGURE 2 of the drawings and will be described hereinafter in greater detail.

Operating within the above temperature and pressure ranges and employing a quench gas containing an optimum amount of ammonia between about 3.5 and an amount about equal to the concentration of ammonia in the effluent to be quenched, provides a yield of ammonia per pound of catalyst per mol of feed much greater than is obtained by any of the commercial methods employed heretofore.

A particular advantage of the preferred embodiment of the present invention is that ammonia can be easily recovered from the product gases of the present process since the preferred quench is restricted in composition to those materials normally present in the effluent gases.

The quench gas used in this invention preferably comprises hydrogen and nitrogen with the desired concentrations of ammonia; however, the use of other materials in addition to the synthesis feed, such as inert gases, e.g. argon containing ammonia is not precluded. Since it is necessary that the quench gas be compressed before being introduced into the reactor, it is preferred that the quantity of quench gas be held to a minimum.

The preferred quench material namely that comprising nitrogen, hydrogen, and ammonia may be obtained from a number of sources. For example, the reaction product or a portion thereof may be treated for the partial removal or addition of ammonia to provide a quench gas having a desired ammonia concentration or, the effluent from one or more of the reactor catalyst beds wherein the effluent from the single bed or a combination of effluents from a plurality of beds may be used to obtain the desired percent of ammonia for the quench gas to all of the beds; or the quench gas may comprise a suitable mixture of feed gas and effluent from one of the more enriched catalyst beds. It is also within the scope of this invention to employ feed gas wherein a calculated amount of liquid or gaseous ammonia has been added to provide a suitable quench to each catalyst bed, thus providing a quench having an ammonia concentration similar to that of the effluent entering each of the catalyst beds. These and many other procedures may be used to provide a quench stream having an ammonia concentration of a desired percent within the limitations discussed herein. However, in the most preferred embodiment of the invention, the quench to each bed has substantially the same ammonia concentration as the effluent to which it is added and comprises, other than ammonia, essentially hydrogen and nitrogen.

The quench is preferably introduced as a gas as hereindescribed; however, it is also within the scope of the present invention to employ liquid ammonia in the quench. However, this is usually avoided by employing the preferred minimum quench temperature of about 100° C.

The following table is presented to illustrate the effect of carrying out the synthesis of ammonia with and without substantial quantities of ammonia in the quench material. It will be noted that in case number 11, it was necessary to provide 13 beds in order to obtain a substantial yield of ammonia as against case numbers 7, 9 and 13 wherein only 4 to 6 catalyst beds were required to obtain an even higher yield of ammonia. The general operating conditions for the following cases include:

Pressure _____ atmospheres__ 285
Inlet temperature to first bed_____° C__ 360
Outlet temperature from each bed_____° C__ 500
Quench temperature_____° C__ 100
Inlet temperature to succeeding beds_____° C__ 450

No ammonia was present in the feed to the first bed in each of the above cases.

Cases 11 and 13 in Table I relate to operations wherein catalyst beds of equal size are used. Here the effect of substantial amounts of ammonia in the quench is readily apparent.

Table I

| Case No. | Bed Inlet,[1] Temp., °C. | Number of Beds Req'd | Bed Sizes | Quench, Mole Percent NH₃ | Effluent, Mole Percent NH₃ | Total Bed Volume | Moles NH₃/1 Mole Feed/ Cu. Ft. Catalyst | Tons NH₃ day × Cu. Ft. Catalyst |
|---|---|---|---|---|---|---|---|---|
| 1 | 360 | 3 | Variable | 0 | 18.0 | 2.20 | 6.65 | 1.36 |
| 2 | 360 | 2 | do | 12 | 18.7 | 1.81 | 6.28 | 1.28 |
| 3 | 360 | 2 | do | 5 | 16.0 | 1.35 | 8.55 | 1.74 |
| 4 | 360 | 2 | do | 8 | 17.2 | 1.81 | 7.65 | 1.56 |
| 5 | 450 | 8 | do | 0 | 18.7 | 1.89 | 8.00 | 1.63 |
| 6 | 450 | 6 | do | 5 | 19.4 | 1.64 | 8.17 | 1.67 |
| 7 | 450 | 4 | do | 12 | 18.2 | 1.08 | 10.41 | 2.12 |
| 8 | 450 | 5 | do | 8 | 19.0 | 1.37 | 8.89 | 1.81 |
| 9 | 450 | 4 | do | 10 | 17.3 | 1.00 | 11.20 | 2.29 |
| 10 | 450 | 4 | do | 15 | 19.2 | 1.20 | 9.25 | 1.89 |
| 11 | Variable [2] | 13 | Equal Volume | 0 | 17.6 | 1.51 | 9.45 | 1.92 |
| 12 | 360 | 2 | Variable | Effluent from each bed. | 17.2 | 1.50 | 7.60 | 1.55 |
| 13 | Variable [3] | 6 | Equal Volume | 12 | 17.9 | 1.02 | 10.91 | 2.23 |

[1] All but first bed of series.
[2] 450° C. to 485° C.
[3] 450° C. to 480° C.

Figure 3:
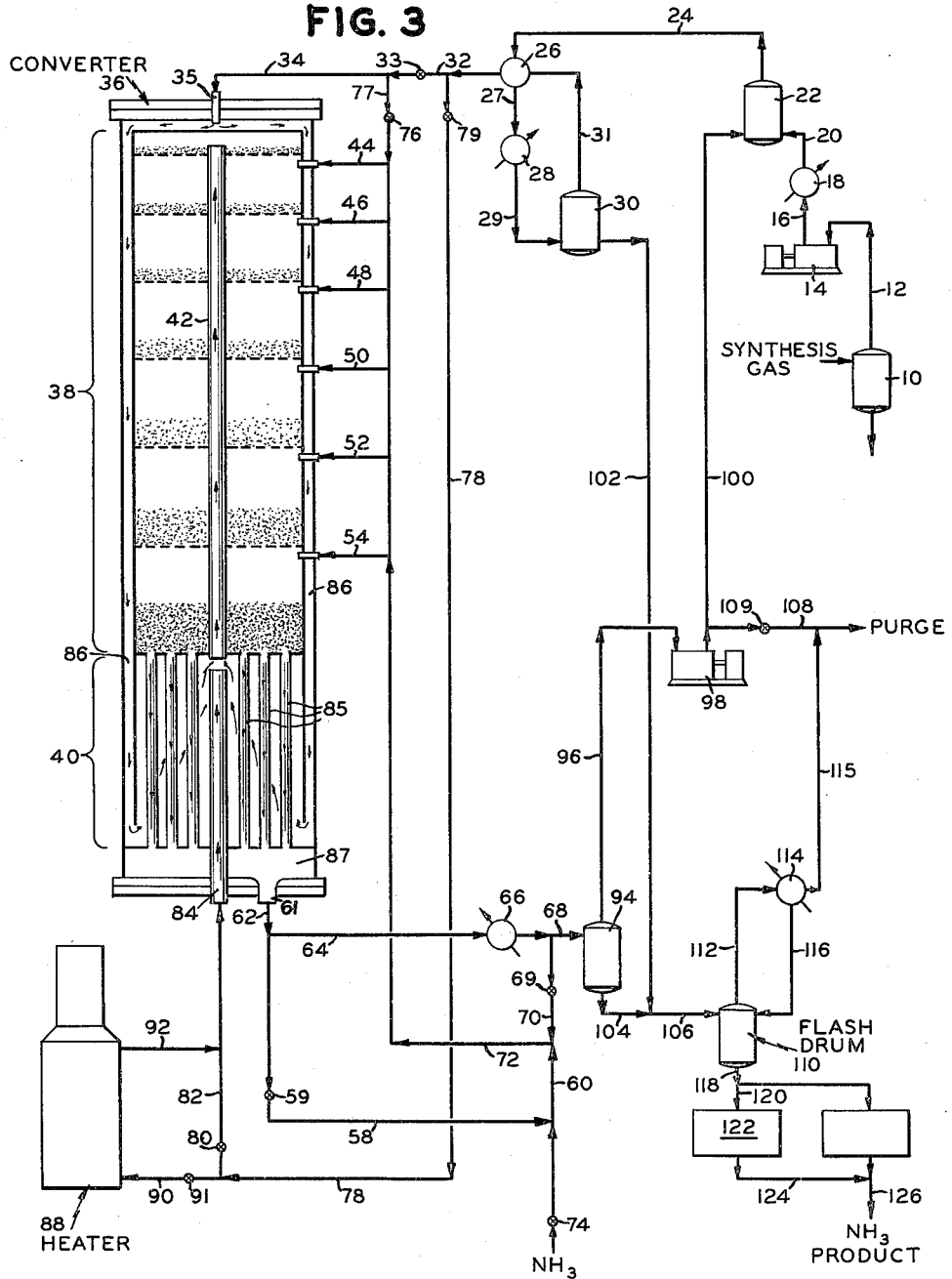
Figure 4:
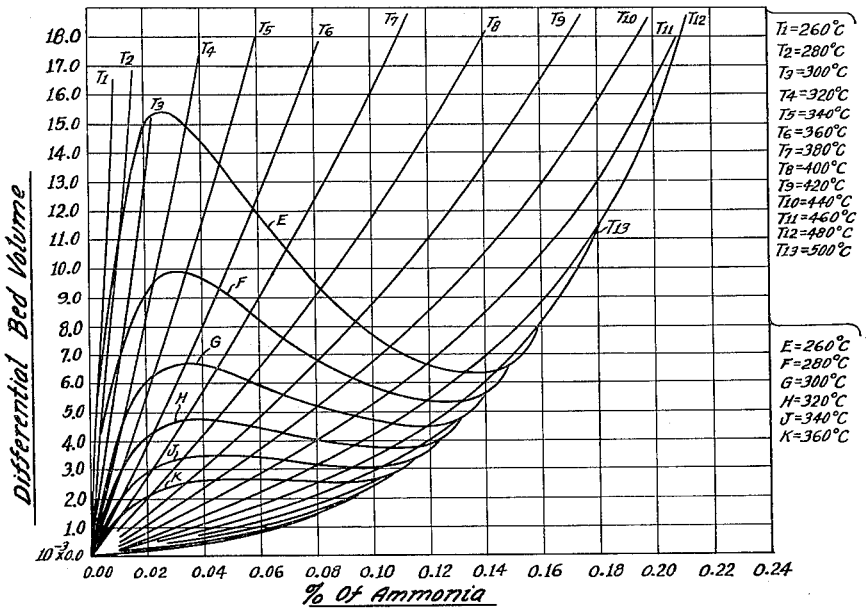
Figure 5:
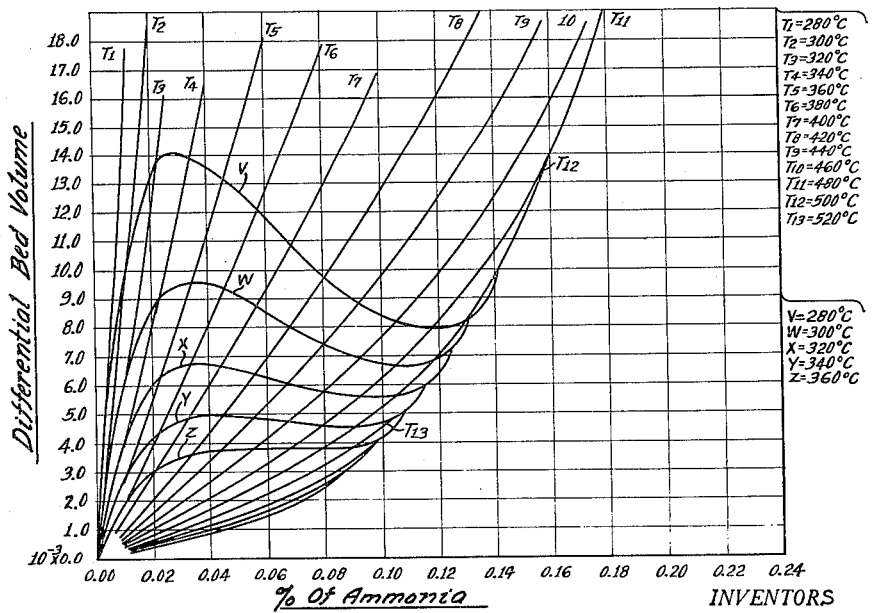
Figure 6:
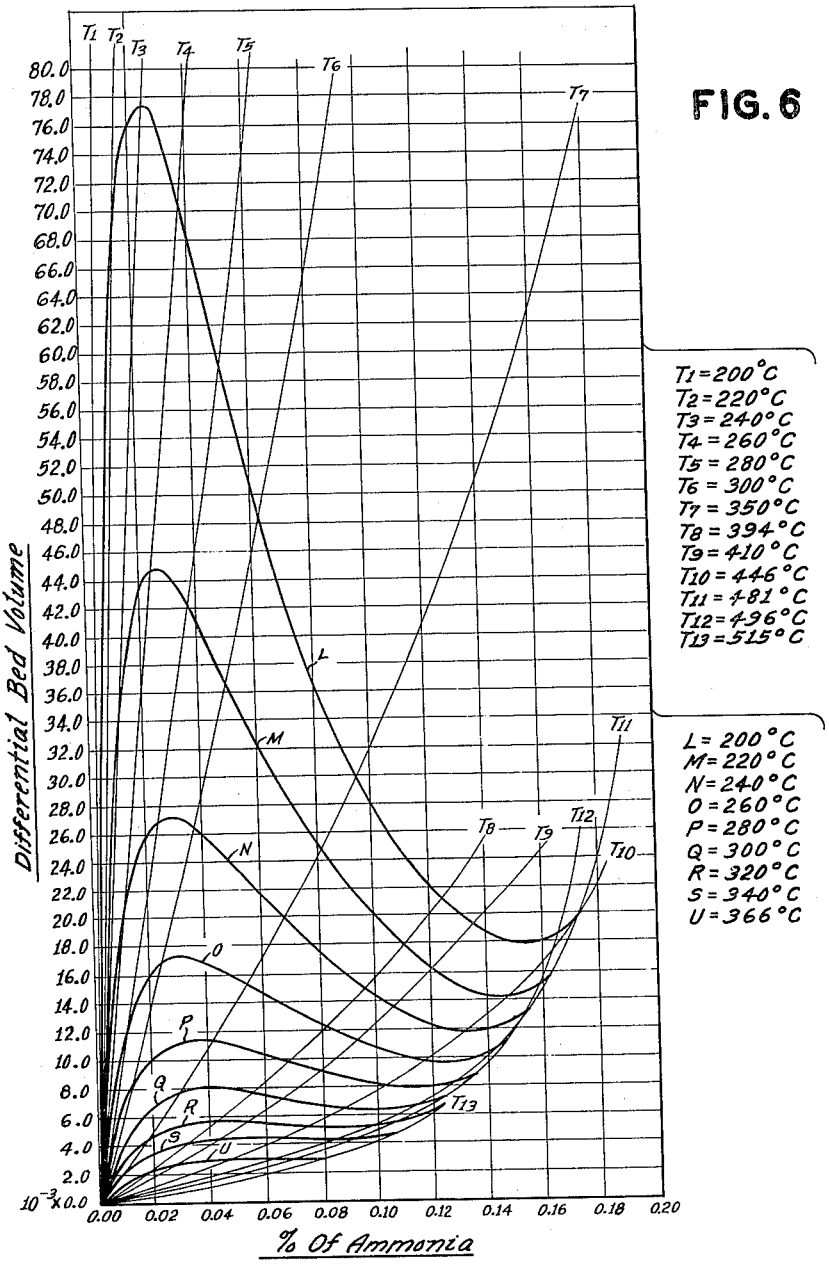

In order to obtain a better understanding of the present invention, reference is had to the accompanying drawings, of which FIGURES 4 through 6 inclusive are graphic ammonia reactors which illustrate the change in temperature, ammonia made in the system and catalyst bed size when the pressure and the total heat is constant as in an adiabatic reactor; FIGURE 3 is a diagrammatic illustration of an ammonia synthesis process employing the present invention; FIGURE 2 is a curve illustrating the effect of reactor efficiency on product composition, and FIGURE 1 is a curve representing the effect of temperature and quench composition on the mols of ammonia produced.

FIGURE 1 illustrates how the reactor efficiency may be substantially improved by employing the process of the present invention. The examples represented by curves C and D were carried out in the apparatus shown in FIGURE 3. In both cases the ammonia synthesis was carried out under 285 atmospheres pressure with synthesis feed gas substantially free of ammonia. The temperatures of the reactant gases entering the first catalyst bed were 360° C. (curve C) and 450° C. (curve D). In each catalyst bed the reaction mixture was allowed to increase to 500° C. whereupon the gases were withdrawn from the bed and quenched with a quench material at 100° C. The effluent gases from the catalyst beds in the example of curve C were quenched to 360° C. whereas the effluent gases from the catalyst beds in the example of curve D were quenched to 450° C., which quench temperatures correspond with the respective bed inlet temperatures. The catalyst employed in both runs was ferric oxide.

As illustrated by the curves, the reactor efficiency is markedly improved when employing optimum amounts of ammonia in the quench composition in excess of 3.5 mol percent. Optimum quench compositions can be determined for other operating quench temperatures by interpolation of the C and D curves.

Reference is now had to FIGURE 2 which illustrates the relationship between the mol percent of ammonia in the product and the reactor efficiency. In both of these examples, the ammonia synthesis was carried out under 285 atmospheres pressure. In case A, the feed to the first catalyst bed entered at 360° C. and the temperature in each of the plurality of catalyst beds, of which there were five, was allowed to increase to 500° C., whereupon effluent was withdrawn and quenched to 420° C. with fresh synthesis gas substantially free of ammonia. In case B, the feed to the first catalyst bed entered at 450° C. and the temperature in each of the plurality of catalyst beds (five) was allowed to increase to 500° C. whereupon effluent was withdrawn from the beds and quenched to 450° C. with fresh synthesis gas substantially free of ammonia. As illustrated by the curves, the mols of ammonia produced per mol of feed decreases with the mol percent ammonia in the product. Again the catalyst employed was ferric oxide.

Referring to FIGURE 3, the synthesis gas or feed gas stream, comprising a mixture of hydrogen and nitrogen in a mol ratio of 3:1, is introduced into separator 10 wherein entrained liquid is separated. The synthesis gas stream is transferred through conduit 12 to compressor 14 wherein the pressure is increased to about 320 atmospheres and the compressed gas is then passed through conduit 16 into cooler 18 to reduce the temperature of the compressed gas to about 30° C. The cooled gas is delivered to an oil separator 22 by means of line 20 and the cooled compressed synthesis gas feed at a temperature of about 30° C. is then passed through conduit 24 to an indirect heat exchanger 26 to cool the gas to about 20° C. After cooling to about 20° C., the gas is sent to a second cooler 28 to further reduce the temperature to about −6° C. and then into separator 30. In gas separator 30, the vaporous ammonia introduced from recycle line 100, hereinafter described, is separated from the synthesis feed gas. The synthesis gas, having an ammonia content of about 2 percent, is passed by conduit 31 to heat exchanger 26 in indirect heat exchange with combined fresh feed and ammonia recycle gas, hereinafter described, to increase the temperature of the synthesis feed gas to about 15° C. From heat exchanger 26, the gas, at a temperature of 15° C. and 316 atmospheres pressure, is transferred through lines 32 and 34 into the ammonia converter.

The ammonia converter 36 consists of a high pressure shell containing a catalyst section 38 and a heat exchanger section 40. The catalyst section is comprised of a number of cylindrical baskets containing catalyst and these baskets are arranged to provide a series of catalyst beds one above the other. The catalyst section also contains a hollow, central tube 42 beginning at the bottom of the catalyst section, extending upwardly through each of the beds and terminating above the uppermost catalyst bed. Intermediate each catalyst bed is a vapor space provided for introducing quench gas to cool effluent reaction gases leaving a catalyst bed. The catalyst beds are arranged in the converter so that the top bed contains the smallest quantity of catalyst. In order to maintain suitable temperature gradient in the succeeding beds, the beds are graduated so that the largest bed is at the bottom of the catalyst section. Located beneath the catalyst section is the heat exchanger section 40 which is used to preheat fresh feed against the hot effluent gases from the final catalyst bed in the catalyst section. The heat exchanger section is comprised of a plurality of baffled, hollow tubes 85 adapted for removing product gas from the catalyst section and connecting the final catalyst bed with a cavity 87 in the base of the converter provided for collection of product effluent; take-off means 61 below said cavity for removing product effluent from the converter; and a hollow central by-pass tube 84 passing centrally through the base of the converter which extends upwardly to a point below the central tube of the catalyst section.

In order to control the temperature of the reaction zone, that is, the temperature of each catalyst bed and the unconverted reactants plus product passed through each catalyst bed, provisions are made for introducing quench material at a point intermediate of each catalyst bed. In this particular example, the quench gas, at a temperature of 100° C., containing about 10 percent ammonia by volume is introduced into the vapor space intermediate each catalyst bed through lines 44 through 54 inclusive to cool the effluent from the preceding catalyst bed to a temperature of about 450° C. before passing the effluent to the next catalyst bed.

The quench material employed in this specific example is obtained by diluting a portion of the product gas leaving the converter in line 62. The product gas is divided into two portions with one portion being passed by conduits 62, and 64 to a suitable heat exchanger 66 to reduce the temperature of the gas stream to about 20° C. A controlled amount of the cooled effluent is then passed through line 70 by means of valve 69 into line 72 where it is admixed with the other uncooled portion of recycle effluent being withdrawn from the converter through lines 62, 58 and 60 and enters line 72 in an amount sufficient to bring the quench material to a temperature of about 100° C. before passing the combined quench to line 77 and subsequently to branch lines 44 through 54 inclusive for introduction to the converter. Inasmuch as the product effluent in the present case contains about 17 percent ammonia, provision is made to dilute the ammonia content of this stream to about 10 percent by volume by the addition of a controlled amount of fresh synthesis gas through conduit 77 by means of valve 76 prior to introduction of the quench into the quench zone of the converter.

In another instance, however, where the product gas leaving the converter contains a lower percentage of ammonia than that desired for quench, the ammonia content of the gas may be increased by introducing a controlled amount of pure ammonia through lines 74 and 60 and passing the enriched ammonia quench gas from line 72 through line 77 and directly through conduits 44 to 54 inclusive, thereby eliminating the addition of fresh synthesis gas as a diluent.

From the point of entry of feed through conduits 34 and 35, the gas flows downwardly between the converter shell and the walls of the catalyst and heat exchange sections in space 86. From this space the gas enters the heat exchanger provided by the plurality of baffled, product take-off tubes 85. The gas passes from the bottom of the heat exchanger upwardly along the baffled tubes and enters central tube 42 passing upwardly therethrough to the first catalyst bed. The catalyst used in this specific example comprises iron oxide promoted with chromia. As a result of passing the feed gas or reactant gases through the converter in the manner hereinbefore described, the temperature of the gas reaching the first catalyst bed at the top of the converter is at about 360° C. The feed gas then passes downwardly through the first catalyst bed under synthesis conditions hereinafter specifically described. The hot reaction products and the unreacted synthesis gas leaving the first catalyst bed is passed into a first quench zone wherein they are cooled to about 450° C. with incoming quench material introduced by conduit 44. In each of the catalyst beds shown, the temperature of the reaction gas is allowed to increase to about 500° C. whereupon the gas is passed out of the catalyst bed and quenched in the quenching zone by the quench gas at 100° C. to a substantially lower temperature (450° C.) before entering the succeeding catalyst bed. This procedure is repeated through the catalyst section and the product gas with unreacted synthesis gas, leaving the last catalyst bed, is passed directly into the product take-off tubes and is removed from the converter by means of conduit 61 and line 62.

After passage through the catalyst section 38, the reaction product containing about 17 percent ammonia passes through the product take-off tubes 85 in section 40 wherein the product gases give off sufficient heat to the incoming feed to reduce the temperature of the product gas to about 230° C.

In addition to the feed conduit 34, a by-pass line 78 is provided with a valve 79, for the admission of a controlled amount of synthesis gas to the bottom of the converter from line 82, through the by-pass tube 84 in the center of the exchanger 40, thus permitting introduction of the feed gas to the converter without preheating so as to control the temperature at the top of the converter at about 360° C. The amount of synthesis gas flowing through line 34 and line 78 can be controlled by means of valves 33 and 79 respectively.

A major portion of the product gas from the ammonia converter after leaving the heat exchanger 40 is passed through the water cooler 66 wherein the temperature is reduced to about 20° C., and is then passed to separator 94. In this separator the gas, containing about 7 percent of entrained ammonia, passes through conduit 96 to the suction of a circulating compressor 98 and is introduced to oil separator 22 through conduit 100 where it is combined with the fresh feed entering the process from separator 10. A small quantity of recycle gas is purged continuously through conduit 108 by means of valve 109 in order to prevent the build-up of inert gases in the system. The combined fresh feed and the ammonia recycle gas, at a temperature of 30° C., are passed through conduit 24 into exchanger 26, refrigerator 28 and then into separator 30 from which liquid ammonia is withdrawn as product at about −6° C. through conduit 102. In the bottom of separator 94, condensed ammonia accumulates, is withdrawn through conduit 104 and combined with the ammonia from separator 30 in line 106. The combined ammonia stream from separators 30 and 94 is passed through conduit 106 to a flash drum 110 wherein the pressure is reduced to about 14 atmospheres. In this vessel, dissolved inerts are flashed along with a small amount of ammonia, the mixture passing through conduit 112 and ammonia condenser 114, wherein most of the vaporized ammonia in the gas is condensed and returned to the flash drum through conduit 116. The remaining gas is purged from the unit through lines 115 and 108. Product ammonia from the flash drum is passed through conduit 118 and 120 into a weighing tank 122 from where the ammonia product is recovered through conduit 124 and 126. To provide a continuous measure of the yield, a second weighing tank is used alternatively with tank 122.

Normally, in the operation of the above process no outside heat source is required since the ammonia process is exothermic. However, when starting up the unit, a start-up heater 88 is provided to bring the cold reactants up to a temperature sufficient to initiate the synthesis reaction. Line 34 is closed off by means of valve 33 and line 82 is closed by means of valve 80 to prevent the unheated feed from entering the converter. The fresh synthesis gas is supplied from lines 78 and 90 to start-up heater 88 and the heated gas is transferred to the converter through line 92 and line 82 into by-pass tube 84. When preheating in the start-up heater is discontinued, valve 91 is closed to prevent synthesis gas from circulating therethrough.

The specific process previously described represents only one embodiment of the present invention, however, it is to be understood that many modifications of the above process and many other processes may be employed without departing from the scope of this invention. It is also to be understood that FIGURE 3 is suitable for carrying out methanol synthesis and that carbon monoxide and hydrogen gas may be substituted for the nitrogen and hydrogen gas feed of the ammonia synthesis and methanol may be substituted for ammonia in the quench gas. In the case of a process for preparing methanol, a typical example comprises contacting a mixture of carbon monoxide and hydrogen in a ratio of about 1:2.2 with a zinc oxide-chromium oxide catalyst at a temperature between about 200° C. and about 350° C. and a pressure of between about 50 and about 1000 atmospheres. In this process, the catalyst is arranged in a plurality of beds and quench gas, preferably comprising methanol (between about 3.5 percent by volume and an amount about equal to the concentration of methanol in the material to be quenched), carbon monoxide and hydrogen is used to cool the effluent gas leaving each catalyst bed in the reactor to a temperature preferably 50° C. below the catalyst decomposition temperature and below the temperature at which equilibrium conditions are reached. The cooling is effected before the gas enters the next catalyst bed wherein the equilibrium temperature and catalyst decomposition temperature is again approached.

Referring now to FIGURES 4 through 6, of which FIGURE 4 shows the relationship between the start-up temperature, the amount of ammonia produced in the reactor at a given temperature and the relative size of the reactor at a pressure of 285 atmospheres; FIGURE 5 shows the same relationship at a pressure of 250 atmospheres and FIGURE 6 shows this relationship at 320 atmospheres. For the purposes of this invention, the start-up temperature is defined as the temperature at which the reactants enter the first catalyst bed of the ammonia synthesis reactor and the point at which the ammonia content of the reaction mixture is approximately zero. FIGURES 4 through 6 are based on an ammonia synthesis reaction wherein the catalyst is ferric oxide manufactured from Swedish magnetite and supplied by Topsoe (a company of Denmark); the mol ratio of nitrogen to hydrogen is 1:3; and the amount of inerts (mostly argon and nitrogen) entering the reactor is about 0.8 mol per mol of feed.

For the sake of simplicity, only one of these figures will be discussed in detail as the data can be obtained from each of them in a similar manner. The figures enable the reader to determine, at various start-up temperatures and pressures, the relative volume of the ammonia reactor, the amount of ammonia produced in the reactor before quenching, and the number of catalyst beds in the reactor, since each quench represents one catalyst bed.

FIGURE 4 illustrates the differential bed volume versus the percent of amomnia produced in the reactor at a given temperature under 285 atmospheres pressure. The isothermic lines of the ammonia synthesis reaction are represented by T lines with temperature distances of 20° C. each. The lettered curves which transact the isothermal lines represent the constant heat content of the ammonia synthesis reaction under 285 atmospheres pressure. Each lettered curve is plotted for a specific start-up temperature which is reported in the legend. The points of each curve are obtained by withdrawing samples from an adiabatic reaction at several points along a reactor, recording the temperature at which the sample is withdrawn and analyzing each sample for ammonia content. The relative volume of the reactor is represented by the height of each curve with respect to the Y axis. From FIGURE 4 is can be observed that, although more than 14 percent by volume of ammonia can be produced before it is necessary to quench when 260° C. is the start-up temperature (curve E), the relative size of the reactor compared with curves F through K, is so great that start-up temperatures in excess of 260° C. are recommended at this particular pressure. For example, the same amount of amomnia can be produced by introducing the reactants to the first catalyst bed at 360° C.; allowing the reaction to run to 500° C.; and similarly quenching and repeating this operation as often as is necessary to obtain the desired production of ammonia product. It can be seen in FIGURE 4, that, if each time the reaction mixture reaches 500° C. (T13), it is quenched to 460° C. (T11), three quenching operations are required to attain 15.5 percent ammonia in the reaction mixture, whereas if the quench temperature is raised to 480° C. (T12), five quenching operations result in the production of approximately 14.6 percent ammonia in the effluent.

The desired amount of quench required to give the desired concentration of ammonia after quenching can be determined by the following linear mixing equation:

$$m_1 p_1 + m_q p_q = m_2 p_2 \qquad (2)$$

wherein $p_1$ is the percentage of ammonia and $m_1$ is the number of mols of ammonia produced in the reactor at the temperature at which quenching is applied (in FIGURES 4 through 6, the value of $m_1$ is 1); $p_q$ is the percentage of ammonia in the quench and $m_q$ is the number of mols of ammonia in the quench required to cool the reaction mixture to the desired temperature; $p_2$ is the percentage of ammonia in the reactor after the quench has been added to the effluent leaving the catalyst bed and $m_2$ is the total number of mols of ammonia after the addition of the quench.

Applying Formula 2 to the data presented in FIGURE 4 and by way of illustration, let it be supposed that 360° C. (curve K) is the start-up temperature and that the reaction is allowed to run until a temperature of 500° C. (T13) is reached. At this point, it is desirable to quench the reaction mixture in order to prevent catalyst decomposition. It is desired, for example, to quench the effluent gas from the first catalyst bed to a temperature of about 460° C. (T11) and to dilute the effluent to an ammonia concentration of about 6.8 percent by volume with a quench gas containing hydrogen, nitrogen and about 4 percent by volume of ammonia. According to formula 2, one mol of quench must be added to the effluent to provide the desired concentration of ammonia in the effluent. It is to be understood, of course, that other quench temperatures and other dilutions, greater or less, may be employed in accordance with the teachings of this invention. It is also to be understood, without departing from the scope of this invention that any of the curves in FIGURE 4, or that any of the curves in FIGURES 5 and 6 can be interpreted in a manner similar to curve K discussed above. Furthermore, it is apparent that values between these curves can be easily interpolated with a high degree of precision.

Having thus described the invention by reference to specific applications, it should be understood that no undue limitations should be imposed by reason thereof, but that the scope of the invention is defined by the appended claims.

Having thus described our invention we claim:

1. A process for converting reactant gases in an exothermic type of reaction, in the presence of a catalyst to the corresponding addition product which comprises introducing a feed of reactant gases into a converter containing a plurality of catalyst beds, passing the gases successively through each of the catalyst beds under reaction conditions, permitting the temperature in each catalyst bed to approach the equilibrium temperature of the reaction, withdrawing the gases from each of said catalyst beds within the reactor before the equilibrium temperature and the catalyst decomposition temperature is attained and cooling the gases between catalyst beds by direct heat exchange with a quench material containing at least 3.5 percent by volume of the addition product of the reaction and containing at least 1 percent addition product in excess of that present in the feed whereby the temperature of the reaction in the converter is maintained at all times below the equilibrium temperature of the reaction and below the temperature at which catalyst decomposition occurs.

2. A process for converting reactant gases in an exothermic type of reaction, in the presence of a catalyst, to the corresponding addition product which comprises introducing a feed of reactant gases into a converter containing a plurality of catalyst beds, passing the gases successively through each of the catalyst beds at a temperature of at least 200° C. and below the catalyst decomposition temperature and the equilibrium temperature of the reaction and a pressure of between about 50 atmospheres and about 1,000 atmospheres, permitting the temperature in each catalyst bed to approach the equilibrium temperature of the reaction, withdrawing the gases from each of said catalyst beds within the reactor before the equilibrium temperature and the catalyst decomposition temperature is attained and cooling the gases between catalyst beds to a temperature below the equilibrium temperature of the reaction and the temperature at which catalyst decomposition occurs by direct heat exchange with a quench material containing at least 3.5 percent by volume of the addition product of the reaction and containing at least 1 percent addition product in excess of that present in the feed whereby the temperature of the reaction in the converter is maintained at all times below the equilibrium temperature and below the temperature at which catalyst decomposition occurs.

3. A process for converting reactant gases containing hydrogen and nitrogen to ammonia in an exothermic type of reaction in the presence of an inorganic metal catalyst at a temperature of at least 300° C. and below the catalyst decomposition temperature and the equilibrium temperature of the reaction, which comprises introducing a feed of reactant gases into a converter containing catalyst arranged in a plurality of beds, passing the gases successively through each of the catalyst beds, permitting the temperature of the gases in each catalyst bed to rise, withdrawing the effluent gases from each of said catalyst beds within the reactor before the catalyst decomposition temperature and the equilibrium temperature of the reaction is attained, and cooling the effluent gases between catalyst beds to a temperature of at least 50° C. below the temperature of the effluent gases to be quenched by direct heat exchange with a cooled quench material containing at least 1 percent ammonia in excess of that present in the feed and containing between about 3.5 percent by volume and an amount about equal to the concentration of ammonia in the effluent to be quenched whereby the temperature of the reaction in the converter is maintained at all times below the temperature at which catalyst decomposition occurs, and below the temperature at which the reaction attains a state of equilibrium.

4. The process of claim 3 wherein the quench material comprises a portion of the effluent gas from at least one of the catalyst beds which has been withdrawn from the converter and cooled to a desired temperature.

5. The process of claim 3 wherein the quench material comprises a cooled mixture of reactant gases and effluent gases from at least one of the catalyst beds mixed in such proportion to provide a quench material of desired ammonia concentration.

6. The process of claim 3 wherein the quench material comprises a portion of the effluent gas from the final catalyst bed which has been cooled to about 100° C. after leaving the converter.

7. The process of claim 3 wherein the quench material comprises in admixture a portion of the effluent gas from the final catalyst bed which has been cooled after leaving the converter and a gas selected from the group consisting of reactant gases and ammonia whereby the ammonia in the quench is adjusted to the proper concentration.

8. A process for converting reactant gases containing hydrogen and nitrogen to ammonia in an exothermic type of reaction, in the presence of an inorganic metal catalyst at a temperature of at least 330° C. and below the catalyst decomposition temperature and the equilibrium temperature of the reaction, which comprises introducing a feed of reactant gases into a converter containing catalyst arranged in a plurality of beds, passing the gases successively through each of the catalyst beds at reaction temperature and under a pressure of between about 100 to 1,000 atmospheres, permitting the temperature of the gas in each catalyst bed to rise, withdrawing the effluent gases from each of said catalyst beds in the reactor before the catalyst decomposition temperature and the equilibrium temperature of the reaction is attained, and cooling the effluent gases between the catalyst beds to a temperature of at least 50° C. below the temperature of the effluent gases to be quenched by direct heat exchange with a cooled quench material containing at least 1 percent ammonia in excess of that present in the feed and containing between about 3.5 percent by volume and an amount equal to the concentration of ammonia in the effluent to be quenched whereby the temperature of the reaction in the converter is maintained at all times below the temperature at which catalyst decomposition occurs, and below the temperature at which the reaction attains a state of equilibrium.

9. The process of claim 8 wherein the effluent gases from each successive catalyst bed is quenched with a quench material having a greater concentration of ammonia than the quench material used in the preceding bed.

10. The process of claim 8 wherein the effluent gases from each of the catalyst beds is quenched with a quench material having a uniform concentration of ammonia.

11. The process of claim 8 wherein the inorganic metal catalyst comprises iron oxide.

12. The process of claim 8 wherein the inorganic metal catalyst comprises metallic iron.

13. The process of claim 8 wherein the inorganic metal catalyst comprises metallic molybdenum.

14. The process of claim 8 wherein the inorganic metal catalyst comprises nitrides of metal selected from the group consisting of uranium, molybdenum, tungsten and iron.

15. The process of claim 8 wherein the inorganic metal catalyst is pumice covered with metallic sodium.

16. A process for converting reactant gases containing hydrogen and nitrogen to ammonia in an exothermic type of reaction in the presence of an inorganic metal catalyst at a temperature of at least 330° C. and below the catalyst decomposition temperature and the equilibrium temperature of the reaction, which comprises introducing the reactant gases into a converter containing catalyst arranged in a plurality of beds, passing the gases successively through each of the catalyst beds at reaction temperature under between about 200 atmospheres and 50 atmospheres pressure, permitting the temperature of the gases in each catalyst bed to rise, withdrawing the effluent gases from each of said catalyst beds in the reactor before the catalyst decomposition temperature and the equilibrium temperature of the reaction is attained, and cooling the effluent gases between the catalyst beds to a temperature of at least 50° C. below the temperature of the effluent gases to be quenched by direct heat exchange with a plurality of cooled quench gas streams containing substantially hydrogen, nitrogen and ammonia, the concentration of ammonia in each of the quench streams being about equal to the ammonia concentration in each of the respective effluent gases to which quench is introduced, whereby the temperature of the reaction in the converter is maintained at all times below the equilibrium temperature of the reaction and below the temperature at which catalyst decomposition occurs.

17. A process for producing ammonia which comprises introducing a feed of reactant gas containing essentially hydrogen and nitrogen in a mol ratio of about 3:1 under a pressure of between about 200 atmospheres and about 500 atmospheres at a temperature of between about 330° C. and about 485° C. into a converter containing ferric oxide catalyst arranged in a plurality of beds; contacting reactant gases with the ferric oxide catalyst in each of the plurality of said catalyst beds; permitting the temperature of the gases in each catalyst bed to rise; withdrawing the effluent gas from each catalyst bed at a temperature below 530° C.; quenching the effluent gases to a temperature not lower than about 420° C. in a quenching zone between the catalyst beds by direct heat exchange with a cooled quench gas comprising essentially hydrogen, nitrogen and ammonia, the ammonia being present in an amount at least 1 percent in excess of that present in the feed and between about 3.5 percent by volume and an amount about equal to the concentration of ammonia in the effluent to be quenched, whereby the temperature of the reaction in the converter is maintained at all times below the equilibrium temperature of the reaction and below the temperature at which catalyst decomposition occurs; cooling the product gas from the final catalyst bed by indirect heat exchange with incoming reactant gases and withdrawing the cooled product from the converter.

18. A continuous process for producing ammonia which comprises introducing a reactant gas containing essentially hydrogen and nitrogen in a mol ratio of about 3:1 under a pressure of between about 200 atmospheres and about 500 atmospheres into a converter containing ferric oxide-chromia catalyst arranged in a plurality of beds; heating the reactant gases to a temperature of between about 330° C. and about 485° C.; contacting the reactant gases with the ferric oxide-chromia catalyst in each of said plurality of catalyst beds; permitting the temperature of the gases in each catalyst bed to rise; withdrawing the effluent gases from each bed at a temperature of about 500° C.; quenching said effluent gases to a temperature of between about 420° C. and about 480° C., between the catalyst beds by direct heat exchange with a plurality of cooled quench gas streams comprising essentially hydrogen, nitrogen and ammonia, the ammonia concentration in each of the quench streams being about equal to the ammonia concentration of each of the respective effluent gases to which the quench gas is introduced, whereby the temperature of the reaction in the converter is maintained, at all times, below the equilibrium temperature of the reaction and below the temperature at which catalyst decomposition occurs; cooling the product gas leaving the final catalyst bed by indirect heat exchange with incoming reactant gases; withdrawing the product gas from the converter and dividing it into two portions; employing one portion as quench gas after adjusting the ammonia concentration to the desired volume percent; and separating the ammonia from the remaining portion and recycling unreacted material to the converter as a portion of the feed thereto.

19. The process of claim 18 wherein the ammonia is separated from a portion of the converter product mixture by condensation.

20. The process of claim 3 wherein the quench material is obtained by separately withdrawing a portion of the effluent gases from each of the catalyst beds, cooling said portions, and admixing the cooled portions with the respective uncooled portions of effluent gas to attain a temperature of between at least 50° below the temperature of the uncooled effluent gas and at least as high as 300° C. prior to entry of the gaseous mixture into the next succeeding catalyst bed.

21. A process for converting reactant gases containing hydrogen and nitrogen to ammonia in an exothermic type of reaction in the presence of a catalyst which comprises: introducing a feed of hydrogen and nitrogen into a converter containing a plurality of catalyst beds; passing the gases successively through each of the catalyst beds under reaction conditions; permitting the temperature in each catalyst bed to approach the equilibrium temperature of the reaction; withdrawing a gaseous effluent from each of said catalyst beds within the reactor before the equilibrium temperature and the catalyst decomposition temperature is reached; and cooling the effluent gas between said catalyst beds by direct heat exchange with a quench material containing at least 3.5 percent by volume of the ammonia and containing at least 1 percent ammonia in excess of that present in the feed, whereby the temperature of the reaction in the converter is maintained at all times below the equilibrium temperature of the reaction and below the temperature at which catalyst decomposition occurs.

References Cited in the file of this patent

UNITED STATES PATENTS 1,704,214    Richardson  _____ Mar. 5, 1929

UNITED STATES PATENT OFFICE
CERTIFICATE OF CORRECTION

Patent No. 3,002,816                                October 3, 1961

Leo Friend et al.

It is hereby certified that error appears in the above numbered patent requiring correction and that the said Letters Patent should read as corrected below.

Column 11, line 43, for "The" read -- These --; line 54, for "transact" read -- transect --; line 65, for "is" read -- it --; column 14, line 50, for "50" read -- 500 --.

Signed and sealed this 1st day of May 1962.

SEAL)
Attest:

NEST W. SWIDER                                          DAVID L. LADD
Attesting Officer                                      Commissioner of Patents